H. B. LAYMAN.
METHOD OF MAKING CONNECTING RODS.
APPLICATION FILED APR. 24, 1916.

1,378,690.

Patented May 17, 1921.
7 SHEETS—SHEET 1.

UNITED STATES PATENT OFFICE.

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

METHOD OF MAKING CONNECTING-RODS.

1,378,690.   Specification of Letters Patent.   Patented May 17, 1921.

Application filed April 24, 1916. Serial No. 93,052.

*To all whom it may concern:*

Be it known that I, HEBRON BERNARD LAYMAN, a citizen of the United States, and residing at New York, in the county of New York and State of New York, have invented certain new and useful Improvements in Methods of Making Connecting-Rods, of which the following is a specification, such as will enable those skilled in the art to which it appertains to make and use the same.

This invention relates to the manufacture of connecting rods, and the object thereof is to simplify their construction, to make the rods lighter and cheaper, and of uniform weight, without interfering with their efficiency, and with this and other objects in view, the invention consists of a new process of making connecting rods from relatively thin material, and relates particularly to rods having one-piece sheet metal shells or bodies, and more specifically in fashioning said rod shells jointless and edgeless in tubular form from a single piece of metal.

The invention is fully disclosed in the following specification, of which the accompanying drawings form a part, in which the separate parts are indicated by similar reference characters, and in which, by way of example only—

Fig. 13 a side view partly in longitudinal section, and showing the completed rod comprising jointless, edgeless, one-piece sheet-metal rod body or shell, and bearing sleeves, bolt boss reinforcements, shank reinforcements and the like, which parts are particularly referred to hereafter.

Figs. 14$^A$, 14$^B$, 14$^C$, 14$^D$ are sectional views of the piston head portion of the rod, and showing modifications;

Fig. 14$^E$ is a sectional side view showing a modification of the crank head portion of the rod shown in Fig. 14;

Fig. 14$^F$ is an end view of the rod as shown in Fig. 14$^E$;

Figs. 1 to 16 inclusive, hereinbefore described, are intended to illustrate the process which I employ for making a connecting rod, independent of its cap, or a connecting rod in connection with which a cap made in any way or of any material or construction, may be used, but in Figs. 17 to 33 inclusive I have shown my improved process, as applied to making both the rod body or shell and its cap from a single piece or element of relatively thin material or sheet metal, and in these drawings—

Further explaining the drawings:—

Figures 1, 2, 3:
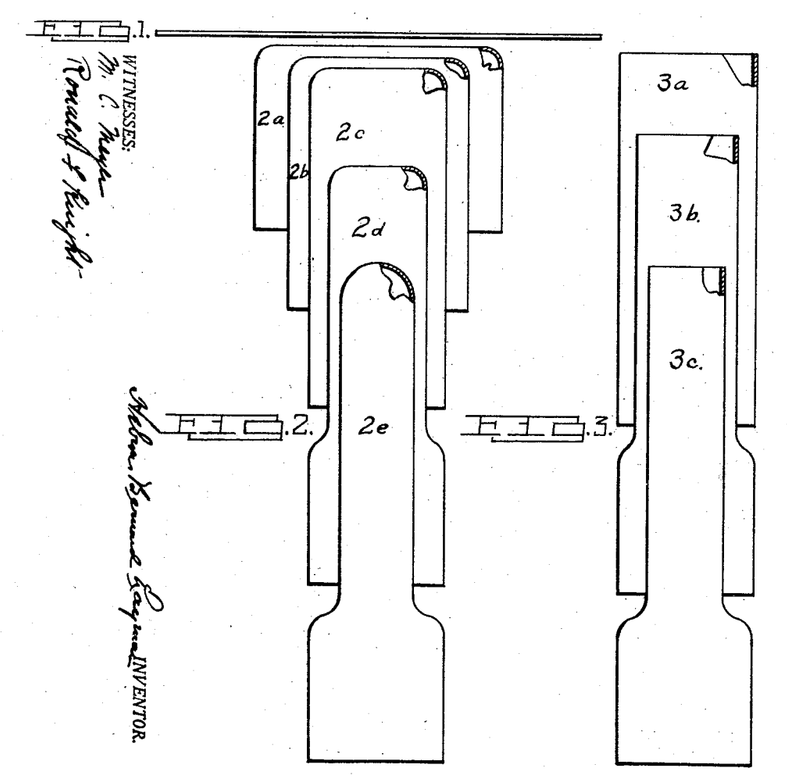
Figure 1 is an edge view of a disk of sheet metal, preferably steel, from which, according to my process, the rod body or shell, independent of the cap, is formed.
Fig. 2 is a view indicating five separate steps in forming the rod body or shell from the disk shown in Fig. 1, part of the separate members of Fig. 2 being broken away.
Fig. 3 is a view similar to Fig. 2, but showing the three first steps of a process which is carried out by substituting a tube open at both ends for the disk shown in Fig. 1.

Fig. 1 shows a sheet metal blank approximately circular;

In Fig. 2—

$2^a$ is a cup drawn from a blank of Fig. 1;

$2^b$ is a deeper cup, the result of re-drawing the cup $2^a$;

$2^c$ is a still deeper cup, the result of a second re-drawing operation.

While I here show three drawing operations to produce the cup $2^c$, I do so by way of example only. As is well known, in working sheet metal, the kind and thickness of material, and its ductility or temper, are all factors which coöperate to determine the number of drawing operations required to produce a cup of given depth and diameter.

$2^d$ is a two-diameter cup produced by swaging or re-drawing the cup $2^c$ for part of its length;

$2^e$ is the cup $2^d$ with the portion of smaller diameter further reduced, thereby elongating it; also the closed end of the cup is shown well rounded out. From this cup $2^e$ the connecting rod body or shell will be formed, the portion of large diameter will be used to form the crank head-end, the smaller diameter portion to form the shank, and the material in the region of the closed end will form the piston-pin head-end.

As previously stated in the operation of my improved process of making a connecting rod body or shell, I may use a piece of material in the form of a tube in substitution for the sheet metal blank of Fig. 1; so—

In Fig. 3—

Figures 4, 5:
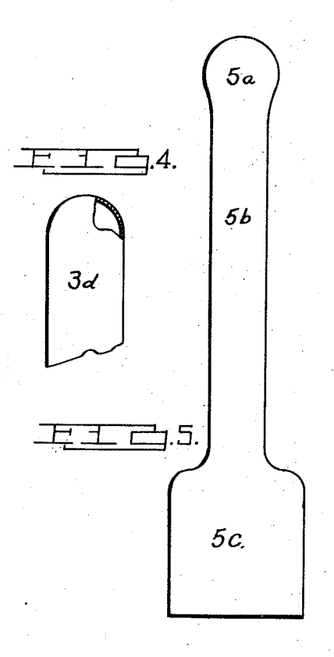
Fig. 4 is a side view of a part of the last element shown in Fig. 3, and shows an additional step of the process, which consists in closing the upper end of the shank of the last element shown in Fig. 3. This last step makes Fig. 3 correspond with the same element shown in Fig. 2.
Fig. 5 is a view of the last element shown in Fig. 2, and showing the next step of the process, which consists in reducing the diameter of the shank portion and thereby elongating and thinning it and partially forming the piston head portion of the rod body or shell at the upper end of the shank.

$3^a$ shows a length of tubing, containing an amount of material approximately equal to that in the blank of Fig. 1;

$3^b$ is the tube $3^a$ reduced in diameter for a part of its length and thereby elongated. This may be accomplished by swaging or by forming in closing-dies; or other desired manner;

$3^c$ is the two-diameter shell $3^b$ with the smaller-diameter portion further reduced and elongated;

In Fig. 4—

$3^d$ is a part of the two-diameter shell $3^c$, showing the end closed over. This may be accomplished in a swaging or hammering machine, or by closing dies in a press, or in any other desirable manner, and when hot or cold.

The two-diameter shell produced in this manner is the counter-part of the two-diameter cup $2^e$ of Fig. 2.

At this time it should be clear that the reducing operations performed on the cup of Fig. 2 or the shell of Fig. 3 may produce a wall of uniform thickness throughout the length of the cup or shell and that by the hammering or swaging and reducing already referred to, I may produce a wall of tapering or varying thickness, but by restraining the elongation of the cup or shell, I may cause the wall of the reduced portion to be thicker at will, that is, for example, thicker in places than was the original sheet metal blank or tube. It should also be clear that I may fashion the cup or the shell with either the larger-diameter portion or the smaller-diameter portion, or both, oval or round, or in any other suitable form. In these two Figs. 2 and 3, however, both the larger diameter portion and the smaller portion are circular in cross section.

In Fig. 5 the smaller diameter portion of the cup $2^e$ of Fig. 2, or the shell $3^d$ of Fig. 4 is further reduced in diameter and elongated, except in the region immediately adjacent to the closed end. This portion is now approximately spherical although of substantially the same diameter as it was before this reducing operation.

The spherical portion $5^a$ will form the piston pin head end, the portion $5^b$ of reduced diameter will form the tubular shank, and the larger end portion $5^c$ will form the crank head end of the rod body or shell, including the bolt bosses which coöperate to retain a cap in place.

Figure 6:
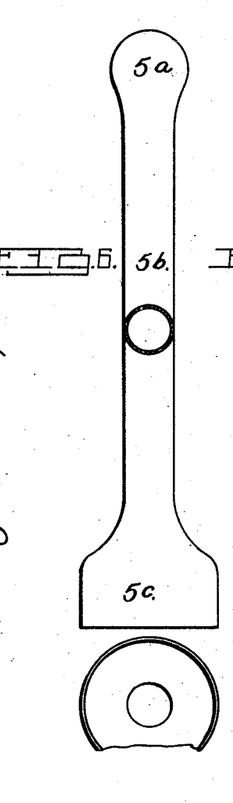
Fig. 6 a view similar to Fig. 5, but showing another step in forming the crank head end of the rod body or shell and also showing the end view.

Fig. 6 shows the rod body after the last reducing operation has been performed upon it, and, comparing it with the preceding figure, it will be seen that the shank portion has been reduced in diameter and is further elongated.

Figure 7:
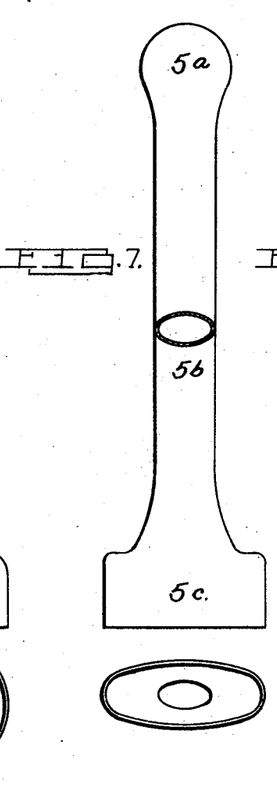
Fig. 7 a view similar to Fig. 6, but showing another step in forming the rod body or shell and especially the crank head thereof.

Fig. 7 shows the next step in the process, which is one of flattening.

It will be noticed that the cross section of the shank shows an oval as distinguished from the circular section of the shank $5^b$ in Fig. 6.

This is also true of the larger end portion $5^c$, as clearly shown in the end view.

Figures 8, 9, 10, 11, 12:
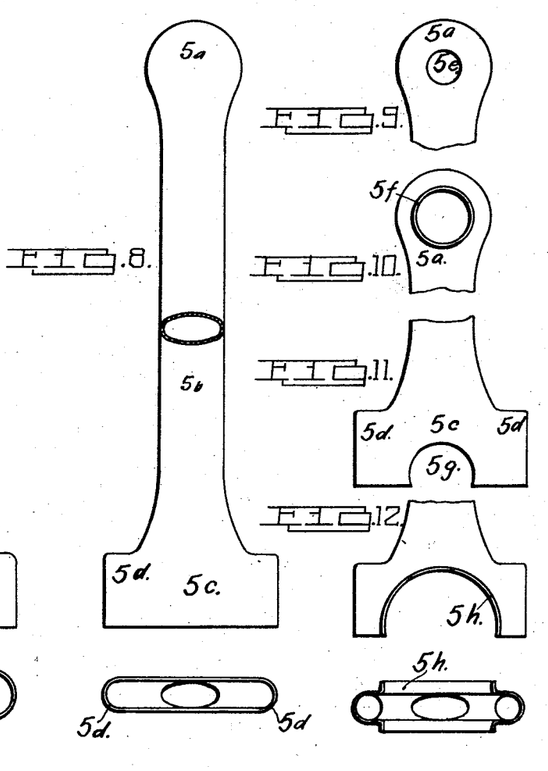
Fig. 8 a view similar to Figs. 6 and 7, but showing yet another step in the formation of the rod body or shell, and especially the crank head thereof.
Fig. 9 a view similar to Fig. 8, but showing the piston head portion thereof only, and showing another step in forming said head portion.
Fig. 10 a view similar to Fig. 9, but showing still another step in the formation of the piston head portion.
Fig. 11 a view similar to Fig. 8, but showing only the crank head end of the rod body or shell and showing an additional step in the making of said portion.
Fig. 12 a view similar to Fig. 11 of the crank head portion of the rod or shell and showing yet another step in its formation, and also showing an end view thereof.

Fig. 8 shows the rod body or shell finally flattened, and with the corners of the bolt boss portion $5^d$ finally shaped. In the end view of Fig. 8 it will be observed that the portions $5^d$ are semi-cylindrical in form.

In Fig. 9 is shown another step in the process, and this is the cutting of the hole $5^e$ in the piston pin head portion $5^a$.

In Fig. 10 the metal immediately adjacent to the hole $5^e$ of Fig 9 is turned at right angle to its normal plane into an outwardly extending cuff $5^f$. Both the side walls forming the piston head portion $5^a$ are provided with cuffs, and these together form a piston pin boss, adapted to receive a piston pin, or to receive a bearing which in turn admits the piston pin.

In Fig. 11, $5^g$ is a hole that has been punched in the wall of the crank head end of the rod body or shell, and In Fig. 12 the metal adjacent to this hole is shown turned outward to form a cuff $5^h$, which coöperates to form the crank pin boss.

After this step, the exposed edges of the rod body are trimmed in any desirable manner.

Figure 14:
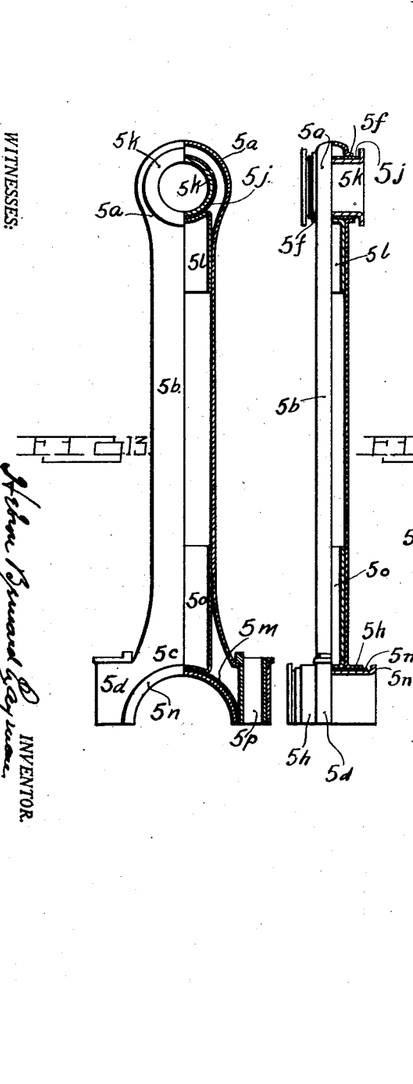
Fig. 14 is a view at right angle to that of Fig. 13, and partly in section.

In Figs. 13 and 14 is shown the complete connecting rod, embodying the one-piece, jointless, edgeless, tubular rod body or shell, produced by the operations previously referred to.

It will be noted that in the piston pin boss formed by the aperture in the head portion $5^a$ and the extending cuffs $5^f$, is fitted the lining bushing $5^j$ and two flanged bushings $5^k$ abutting at the center line of the rod. The flanges of these bushings serve to reinforce the piston pin boss against distortion in service, and they also effectually radiate the heat generated in the piston pin bearing.

Within the shank portion $5^b$ and of like conformation, is a shank reinforcing member $5^l$, which member unites the lining bushing $5^j$ to the shank portion of the rod body or shell, and adequately increases the area of contact of this bushing.

At the crank head end and in the crank shaft aperture, is fitted a lining bushing $5^m$ and flanged bushings $5^n$. These together with the extending cuffs $5^h$ of the rod body or shell, form a crank pin boss.

$5^o$ is a shank reinforcing member for the crank head end.

Within each bolt boss $5^d$ is a flanged reinforcing bushing $5^p$, provided with a lipped seat at one end to restrain the head of the bolt from turning.

In practice I prefer to first assemble into the rod body or shell the piston-end shank-reinforcing member $5^l$ and the liner bushing $5^j$, then I prefer to spot-weld the two together. After this I assemble the flanged liner bushings and when properly located I spot-weld them lightly to tack them in place.

Having first spot-welded the crank end shank reinforcing member $5^o$ and the lining bushing $5^m$, I assemble these in place, then fit the flanged bushings $5^n$ and lightly spot-weld these to the cuffs $5^h$ of the rod body or shell. Then I assemble the bushings $5^p$ in the bolt bosses $5^d$, and lightly spot-weld these two to secure them in place. Then, when the rod body is made of steel, I prefer to braze the two end portions of the rod body by immersion in a molten alloy of metals. This completely fills the crevices and interstices between the several bushings, and between the bushings and the rod body, but it is obvious that I might substitute for brazing a tinning process, or another fusing or welding process, or unite the several parts in any of the well known manners.

At this point it should be noticed that I do not confine myself to making the rod body or shell of any particular material, nor do I limit myself to the length of the shank reinforcing members $5^l$ and $5^o$. These two members may be made of a single piece, or when made of two pieces as shown, their length may be so extended that they will abut.

When this is done I have a substantial column for transmitting the load of the piston pin to the crank pin, and therefore I may form the rod body or shell of a very different kind of material from that composing the shank reinforcing members—for example, of non-ferrous metal such as brass or aluminum. Such a structure is described and broadly claimed by me in a co-pending application, Serial No. 159,398, filed April 3rd, 1917.

After the separate members composing the rod are assembled to the rod body as previously explained, the whole is then finished to any desired degree of accuracy by machining or grinding or broaching.

In Fig. 14$^A$ a modification of the piston pin boss is shown, in which only a single comparatively heavy lining bushing 5$^q$ is used.

In Fig. 14$^B$ another modification of boss construction is shown, in which two similar flanged bushings 5$^r$ coöperate to compose the piston pin boss.

Figure 14C:
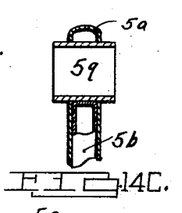

In Fig. 14$^C$ it will be observed that the piston head portion 5$^a$ of the rod body or shell is made without the extending cuffs 5$^f$ of the immediately preceding figures, and that the boss is formed of an aperture in each of the side walls and the single lining bushing 5$^q$.

Figure 14D:
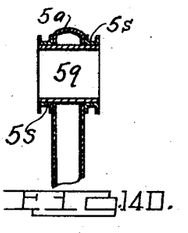

In Fig. 14$^D$ is shown the construction of 14$^C$, but with the addition of a sheet metal cuff 5$^s$ fitted at each end of the lining bushing 5$^q$ and outside thereof. These cuffs have two radial flanges on each, one of each of which is united to the side wall of the piston head portion 5$^a$.

Figure 14E:
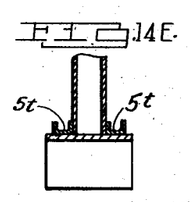
Figure 14F:
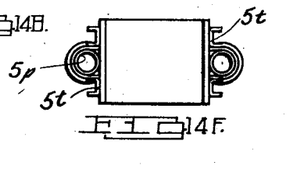

In Figs. 14$^E$ and 14$^F$ a modification of crank pin boss construction is shown, in which 5$^t$ are flanged cuffs, corresponding to the cuffs 5$^s$ of Fig. 14$^D$.

Figure 15:
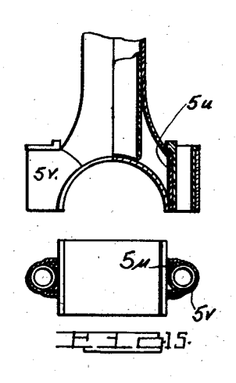
Figs. 15 and 16 are partly-sectioned side views and end views of the crank head portion of the rod, showing the bolt bosses through which are passed bolts to hold a cap in place.

In Fig. 15 is shown a modification of the crank head end, and has particular reference to the construction of the bolt bosses referred to as 5$^d$ in the previous figures. It will be noticed here that the rod body or shell has a substantially cylindrical depression 5$^u$ formed at each side of the crank pin aperture, and to the rod body is joined formed members 5$^v$ which coöperate with the depressions 5$^u$ to form bolt bosses.

Figure 16:
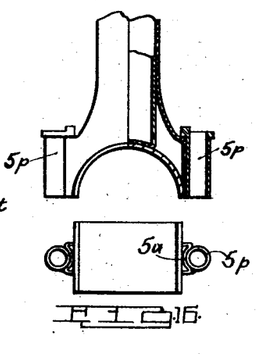

In Fig. 16 the bolt boss construction at the crank head end is formed alone by the depressions 5$^u$ and the liner bushing 5$^p$. These are welded or brazed, or otherwise united together.

As previously stated, all the figures hereinbefore referred to in particular detail, relate to the process which I employ for making a connecting rod independent of its cap, or a connecting rod for which a cap is to be provided, and the cap may, itself, be made in any way by any construction and of any material.

But in the figures following immediately hereafter, I describe in detail my improved process as applied to making a connecting rod when both the rod body and its cap are fashioned from a single piece or element of relatively thin material.

Figures 17, 18:
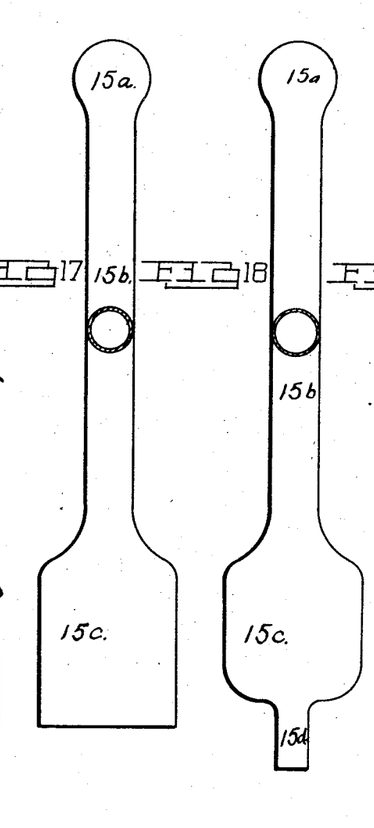
Fig. 17 is a side view of a rod body or shell similar to that shown in Fig. 5, but carried one step farther by reducing and lengthening the shank thereof.
Fig. 18 a view similar to Fig. 17, but showing a further step in the process of forming a rod or shell and its cap.

Fig. 17 is a side view of the rod body or shell, similar to that shown in Fig. 6, which is obtained by proceeding one step farther in reducing and elongating the shank portion of the rod body of Fig. 5. The piston head portion is here denoted by the symbol 15$^a$, the tubular shank portion as 15$^b$ and the crank head portion as 15$^c$. In Fig. 5 the same parts of the rod body are denoted by the characters 5$^a$, 5$^b$ and 5$^c$ respectively.

Fig. 18, another step in the process, shows the closing in of the end of the crank head portion, and the formation of a tubular neck portion 15$^d$ of relatively small diameter from the single piece of material composing the rod body or shell.

Figures 19, 20, 21:
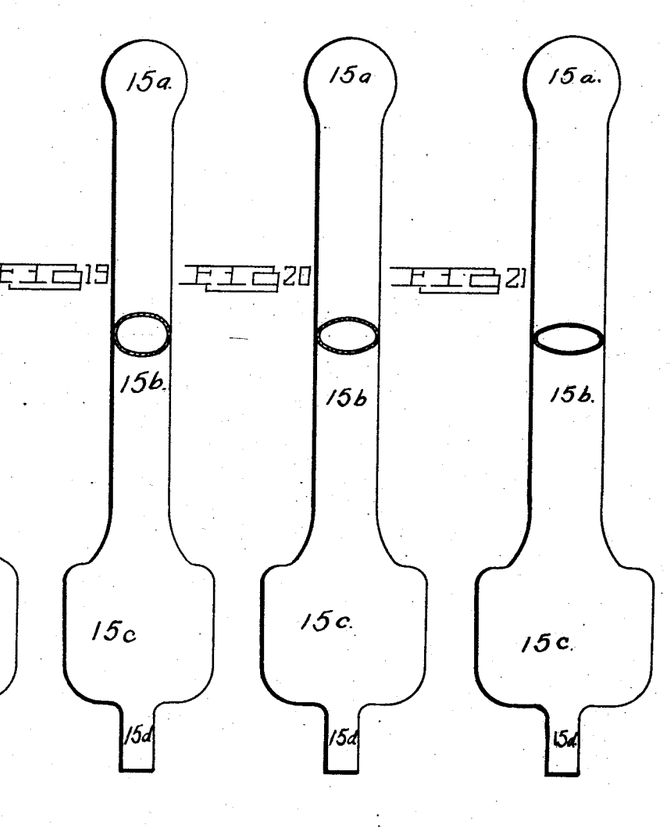
Figs. 19, 20 and 21 are views similar to Figs. 17 and 18, but showing additional steps of the process.

In Fig. 19 is shown the next step, which consists in flattening the rod body to obtain the oval shank when this is desired.

In Fig. 20 is shown a further progression of the flattening process.

In Fig. 21 the rod body or shell is shown finally flattened.

Figures 22, 23, 24, 25, 26, 27:
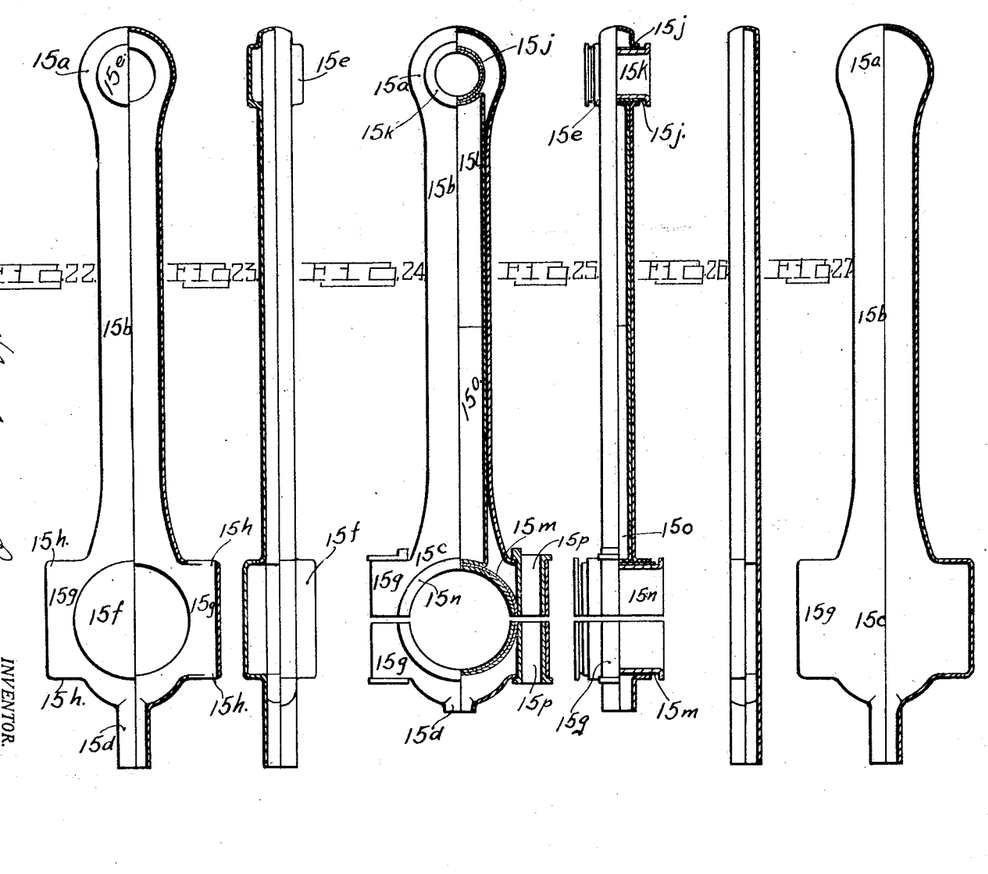
Fig. 22 is a view showing a step of the process in addition to that shown in Fig. 21, and being partially in longitudinal section.
Fig. 23 a view similar to Fig. 22, but at right angle thereto.
Fig. 24 a view similar to Fig. 22, showing the complete rod partially in longitudinal section, and showing the cap severed from the rod body or shell.
Fig. 25 a view similar to Fig. 24, but at right angles thereto.
Figs. 26 and 27 are modifications of the forms shown in Figs. 22 and 23, one being at right angle to the other.

In Figs. 22 and 23 the rod body is shown after the accomplishment of the next step in my improved process. This step consists in fashioning the material in the piston head end to form a piston pin boss 15$^e$, and also fashioning material in the crank head end to form a crank pin boss 15$^f$, and also in filling out the corners of the bolt bosses 15$^g$ in the regions marked 15$^h$. I may accomplish this with dies, but I prefer to perform this operation by filling the piece with fluid and operating a plunger through the opening in the neck 15$^d$, after having located the piece in a suitable die.

In Figs. 24 and 25 the finished rod body or shell is shown with the ends on the piston pin boss 15$^e$ cut away, as also the ends of the crank pin boss 15$^f$; also the surplus end of the neck 15$^d$ is cut off and the rod body or shell is separated through the crank pin boss to form a cap. The piston pin boss 15$^e$ is provided with a liner bushing 15$^j$, and two flanged bushings 15$^k$, which abut at the center of the rod. Within the shank, and of substantially similar conformation, is a reinforcing member 15$^l$ which further unites the bushings in the piston pin boss to the shank portion 15$^b$ of the rod body. This member is especially effective in increasing the ability of the rod to withstand tension.

Within the crank pin boss is a liner bushing 15$^m$ and two flanged bushings 15$^n$ which abut at the center of the rod. Within the shank and united to the bushing 15$^m$ is a reinforcing member 15$^o$. It will be observed that this member abuts with the other shank reinforcing member 15$^l$, and that they together form an adequate column for transmitting the load of the piston pin to the crank pin.

Within this bolt boss 15$^g$ is fitted a liner bushing 15$^p$.

In practice I may first cut the cap from the rod body or shell, then assemble into said rod body or shell the reinforcement $15^l$ and the piston pin boss liner bushing $15^j$ and lightly spot-weld these together and in place. Then I assemble the bushings $15^k$ into liner $15^j$ and spot weld these in place.

Having previously spot-welded the liner bushing $15^m$ to the reinforcing member $15^o$, I assemble these together in place in the rod body or shell and spot-weld them thereto to hold them in place. Then I assemble the flanged bushings $15^n$ and the bolt boss bushings $15^p$ and spot-weld these to the rod body or shell. After this I prefer to braze the rod by immersing the ends in a suitable flux and spelter or other molten metal or alloys. Similarly I assemble the bushings in the cap portion of the rod, and weld and braze them. After this the rod and cap are finished with any desired degree of accuracy by machining or grinding or broaching, or as otherwise may be desired.

In Figs. 26 and 27 I show the appearance of the rod body or shell after the operations shown in Figs. 22 and 23 are performed upon it, but without the bosses $15^e$ and $15^f$ of Figs. 22 and 23 formed upon it. The bolt bosses $15^g$, however, are formed.

Figures 28, 29, 30:
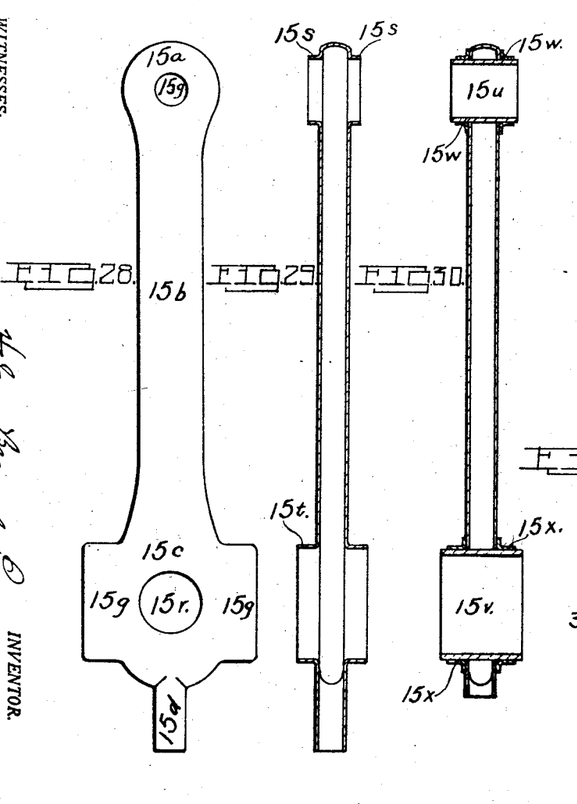
Fig. 28 a view similar to Fig. 27, but showing an additional step in the process.
Fig. 29 is a sectional view at right angle to Fig. 28, but showing another step in the process.
Fig. 30 a view similar to Fig. 29 but showing a modification.

In Fig. 28 the rod body or shell of Fig. 27 is shown with the next step performed upon it, which is one step in an alternative manner of forming the desired piston pin and crank pin bosses. It consists in forming holes $15^q$ and $15^r$ in the end portions of the shell. These are afterward spread to form extended cuffs, which are shown at $15^s$ and $15^t$ in Fig. 29. This shell may then have the reinforcements and bushings of Fig. 24 assembled in the manner already explained.

In Fig. 30 I show yet another manner of forming the piston pin and crank pin bosses. Holes similar to but larger than the holes $15^q$ and $15^r$ are made in the walls of the piston pin end $15^a$ and the crank pin end $15^c$, and fitted with liner bushings $15^u$ and $15^v$ respectively. In addition, at the piston pin end, flanged cuffs $15^w$ further unite the liner bushing to the rod body. A similar construction is shown at the crank pin end, in which the flanged cuffs are designated $15^x$. It will be observed that the cap is not yet cut from the rod body or shell. With this construction the bushings and the like may be assembled in the rod, secured in place, and finish machined, and lastly the cap cut from the rod.

Figures 31, 32:
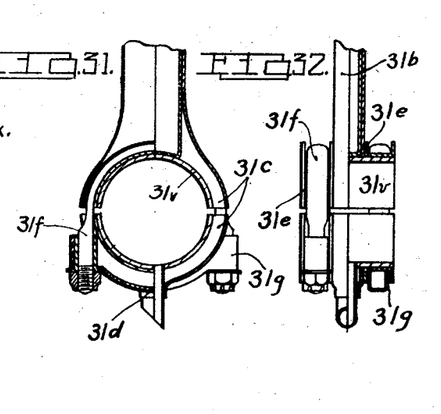
Figs. 31 and 32 are detailed views showing a modification of the crank end of the rod, and showing the same partly in section, one of said views being at a right angle to the other.

In Figs. 31 and 32 the shank portion $31^b$ of the rod has an integral cylindrical head $31^c$ and a neck portion $31^d$ of reduced diameter. This rod body or shell is produced by the same steps of the process hereinbefore described, but the rod differs from the rod previously described particularly in this: the rod itself is not provided with bolt bosses.

At each side of the cylindrical crank shaft head $31^c$ are secured sheet metal cuffs $31^e$, one flange of which is united to the rod body. Between the flanges of each cuff on the rod body is a detachable U-shaped clamp $31^f$, by means of which the cap is secured to the rod. The cap portion of the crank head $31^c$ is shown fitted with detachable pressed metal supplementary caps $31^g$ which coöperate with the U-shaped clamps. The lining bushing $31^v$ in the crank end is similar to the bushing $15^v$ of Fig. 30.

Figure 33:
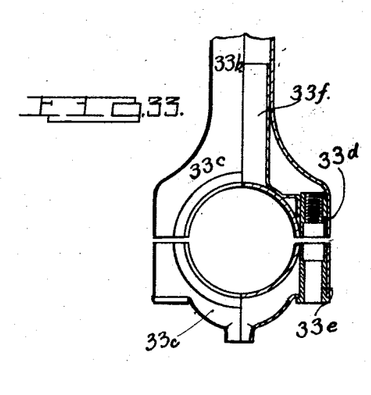
Fig. 33 is a view similar to Fig. 31, but showing another modification.

In Fig. 33 I show another modified form of a crank head of a connecting rod produced by my improved process. It will be seen here that the shank $33^b$ has integral crank head $33^c$, from which a cap is cut. The bolt bosses of the rod are provided with lining bushings $33^d$, which are threaded for a part of their length to receive a stud or cap-screw, and for another part of its length their inner diameters are enlarged to receive a thimble, not here shown, by means of which the cap is alined. It will be seen that the bolt boss bushing $33^e$ in the cap is provided with a flanged seat to accommodate the head of the bolt or the nut of the stud and that the bolt bosses of the rod portion have blind ends. The shank renforcing member $33^f$ is extended to join with the rod body or shell to form a bolt boss.

Figure 34:
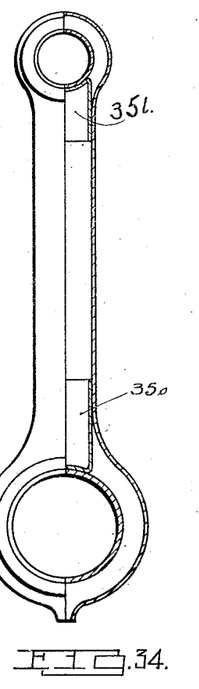
Figs. 34 and 35 are part-sectional views of a rod made according to the second part of my improved process, and in which the crank end is of complete circular form, and from which it is not intended that a cap should be cut.
Figure 35:
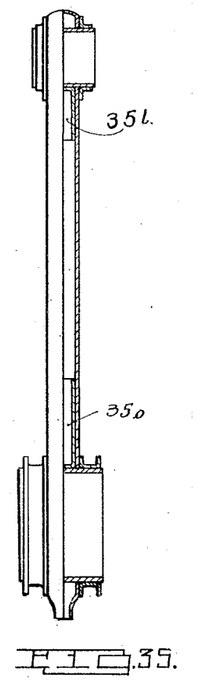

In Figs. 34 and 35 is shown another modification of the connecting rod produced according to my improved process. It will be observed that this rod is greatly similar to that in Figs. 31 and 32, and that it is provided with the shank reinforcing member $35^o$ and $35^l$.

For simplicity sake, I have shown the rods of all the earlier figures as having shank portions which are substantially oval in cross section and of uniform wall-thickness, but I am not limited to such a form, and in Figs. 36 to 44 inclusive I show nine forms of shank which I may use.

Figure 36:
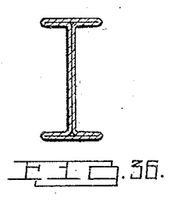
Figs. 36 to 44 inclusive are cross sectional views showing modified forms of the shank portion of the rod body or shell.

In Fig. 36 is shown an I section shank of closed form. Through the steps previously explained, a circular or oval section shank is derived and then this is closed in suitable dies or between channeling rollers to the form shown.

Figure 37:
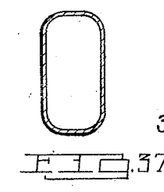

In Fig. 37 is substantially a rectangular cross section shank. This may be obtained by re-shaping the cylindrical shank derived from the steps of the process previously explained, or it may be produced in the first instance with suitable drawing punch and die.

Figure 38:
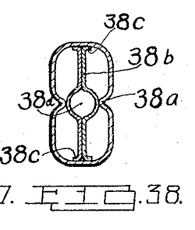

In Fig. 38 the rectangular cross section shank of Fig. 37 is shown with a depression or rib $38^a$ formed in each side wall. Without the addition of such ribs or corrugations, or their equivalent, relatively large areas of sheet metal cannot be used under compression. Within the shank are two smaller reinforcing members 38ᵇ which are united thereto by ribs 38ᵃ and flanges 38ᶜ of the reinforcing members. These members coöperate to form the cylindrical aperture 38ᵈ, by means of which oil may be fed from a hollow crank pin to the piston pin. This feature is described and claimed by me in my co-pending application, Serial No. 86,361, filed March 24th, 1916.

Figure 39:
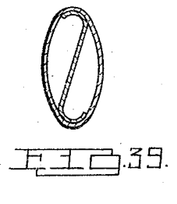

In Fig. 39 an oval cross section shank is shown with an S section reinforcement.

Figure 40:
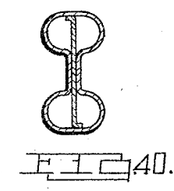

In Fig. 40 a dumb-bell section shank is shown with a simple reinforcing piece.

Figure 41:
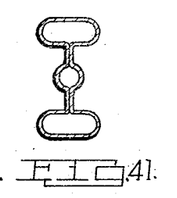

In Fig. 41 a modified dumb-bell section is shown, which has a central passage by which oil may be fed under pressure to the piston pin.

Figure 42:
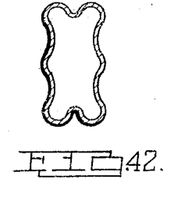

In Fig. 42 a rectangular cross section shank is shown, having a number of corrugations formed in its walls, to give it permanent set and enable it to withstand heavy compression.

Figure 43:
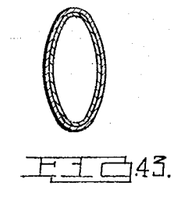

In Fig. 43 the oval cross section shank is shown of the rods of Figs. 13 and 24.

Figure 44:
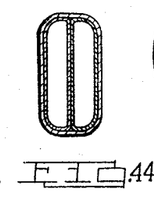

In Fig. 44 is shown a rectangular cross section shank, having two reinforcing members, which together form a central rib of great rigidity. Especially do such reinforcing members make it possible to use a rod body of some lighter material than steel—such as for instance, aluminum or like material. Such a structure was described and broadly claimed by me in my co-pending application, Serial No. 159,398, filed April 3rd, 1917.

From the foregoing description and the accompanying drawings, it will be clear that by this process I produce a connecting rod from thin sheet metal, or from a relatively thin piece of suitable material having a one-piece, seamless, edgeless, jointless, hollow shell, the wall of which is of uniform thickness, or of varying gage, as I choose, and that this rod is of extreme lightness and cheap to produce; that it requires very little, if any, machining, and that these rods will be of uniform weight, and of great strength and ductility.

In connection with Figs. 2 and 3, I stated that the two-diameter cup 2ᵉ or the two-diameter shell 3ᶜ is formed from a single piece of material. It is obvious that I may use two pieces of tubing and butt weld these together, or join them in any other practical manner, and produce a substitute for the cup 2ᵉ or the shell 3ᶜ, and that within the scope of the appended claims, a cup or shell so produced will be a single element, or a one-piece two-diameter cup or shell.

By connecting rod shell it will be understood that I mean the shank portion of the rod with one or both end portions integral therewith, not including such parts, as bearing sleeves, bolt boss reinforcements, shank reinforcing members, &c.

The article shown in the accompanying drawings is claimed broadly by me in United States Letters Patent, No. 1,260,577, issued March 26th, 1918, and certain modifications thereof were disclosed and claimed specifically by me in my co-pending applications Serial No. 88989, filed April 5th, 1916, and Serial Nos. 224,758, 224,759 and 224,760, filed March 26th, 1918.

Having fully described my invention, what I claim as new and desire to secure by Letters Patent, is:—

1. The process of forming a connecting rod shell, which consists in fashioning the said shell in tubular form from a single piece of relatively thin material and then separating the shell through one end to form a cap.

2. The process of forming a connecting rod shell, which consists in fashioning the said shell in tubular form from a single piece of relatively thin material, and then forming part of the piston head portion of the same material.

3. The process of forming a connecting rod shell, which consists in fashioning the said shell in tubular form from a single piece of relatively thin material, then forming part of the crank head portion of the same material and then separating the crank head portion therethrough to form a cap.

4. The process of forming a connecting rod shell, which consists in fashioning the shank portion of said rod in tubular form from a single piece of relatively thin material, and then providing said shank portion with one head portion from the same material.

5. The process of making connecting rod shell which consists in fashioning a single piece of relatively thin material to form a jointless longitudinally edgeless shank integral with the rod shell, and concomitantly fashioning the approximate form of the ends of the shell.

6. The process of making a connecting rod shell which consists in fashioning a single piece of relatively thin material in such a way as to form a jointless longitudinally edgeless shank portion, and concomitantly fashioning the approximate form of the ends of the shell, and thereafter finishing the said ends.

7. The process of making a connecting rod shell, which consists in fashioning a single piece of relatively thin material to form a rod shell, having a jointless longitudinally edgeless shank portion, a part of one end portion integral therewith, and providing another end portion for said shank.

8. The process of forming a connecting rod shell which consists in fashioning a two-diameter tube of relatively thin material into the approximate shape of the finished shell, and concomitantly therewith fashioning a jointless longitudinally edgeless shank portion for the said shell.

9. The process of forming the body or shell portion of the connecting rod from a single piece of relatively thin material, which consists in fashioning said material to form a two-diameter tube, and fashioning said tube to form the shank and one head portion of the rod, and providing another head portion for said rod.

10. The herein described process of making a connecting rod shell, which consists in fashioning a single piece of relatively thin material into the approximate form and length of the shank portion, and fashioning integrally therewith a hollow crank shaft head end for the said shell.

11. The process of forming a connecting rod or shell body of a single piece of relatively thin material, which consists in suitably fashioning the piece to the approximate shape of the finished shell, and then separating it through one end portion to form a cap.

12. The process of forming a connecting rod shell, which consists in suitably fashioning a single piece of relatively thin material to form a connecting rod shell body, then providing one end thereof with a boss, and separating the piece through the boss to form a cap.

13. The process of forming a connecting rod from a single piece of relatively thin material, which consists in forming a two-diameter tube from said material, and fashioning said tube to form the shank portion of the rod and a head portion, and dividing said head portion to form a cap.

14. The process of forming a connecting rod which consists in forming a two-diameter tube from relatively thin material, and fashioning said tube to form the shank portion of the rod and a head portion, and dividing said head portion to form a cap, and providing another head portion for said rod.

15. The method of making connecting rod bodies or shells which consists in shaping a single piece of relatively thin material first into tubular jointless form and thereby approximating the final shape of the shell, and thereafter shaping the ends of the previously fashioned approximately shaped shell to complete the shaping of the ends of the said shell.

16. The method of making connecting rod bodies or shells which consists in fashioning a single piece of relatively thin material into a tubular jointless form to shape the shank portion of the rod, concomitantly shaping the approximate form of the ends of the shell, and then finishing the shaping of the ends of the shell.

17. The method of making connecting rod bodies or shells which consists in fashioning a piece of relatively thin material into a tube to approximate the shape of the shank portion of the rod, concomitantly fashioning hollow ends of the shell into the approximate shape of the piston and crank ends of the shell, finishing the shaping of the said ends, and then fashioning the said ends to receive a piston pin and a crank pin.

18. The method of making connection rod bodies which consists in fashioning a piece of relatively thin material in such a way as to form a jointless longitudinally edgeless shank portion, concomitantly fashioning the approximate form of the ends of the shell, then finishing the shaping of the ends of the shell, and then reinforcing the shank portion.

19. The method of making connecting rod bodies which consists in fashioning a single piece of relatively thin material in such a way as to form a jointless longitudinally edgeless shank portion, concomitantly fashioning the approximate form of the ends of the rod, then finishing the shaping of the ends, providing an interior reinforcement for the shank portion and uniting said reinforcement to the shank portion.

20. The herein described method of making connecting rods which consists in fashioning a single piece of relatively thin material in such a way as to form a jointless longitudinally edgeless tubular shank portion, concomitantly fashioning the approximate form of the ends of the rod, then finishing the shaping of the said ends, then fashioning the said shaped ends to receive a piston pin and a crank pin and then interiorly reinforcing the tubular shank portion.

21. The herein described method of making connecting rods which consists in fashioning a single piece of relatively thin material in such a way as to form a jointless longitudinally edgeless tubular shank portion, concomitantly fashioning the approximate form of the ends of the rod, then finishing the shaping of the said ends, then fashioning the said shaped ends to receive a piston pin and a crank pin, then interiorly reinforcing the tubular shank portion, and then separating one of the said ends to form a cap.

22. The herein described method of making connecting rods which consists in shaping a piece of relatively thin material to form a jointless longitudinally edgeless shank portion having integral therewith jointless hollow end portions approximating the shape of the rod, then completing the shaping of the end portions, then shaping both bosses therein, then fashioning the ends to receive a crank and piston pin, and then reinforcing the shank portion.

23. The herein described method of making connecting rods which consists in shaping a piece of relatively thin material to form a jointless longitudinally edgeless shank portion, concomitantly shaping the said material into the approximate shape of the crank and piston ends of the rod, thereafter finishing the shaping of the said ends, then fashioning the ends to receive a crank and piston pin, and then reinforcing the shank portion adjacent the ends.

24. The process of making connecting rods, which consists in fashioning the rod shell from a single piece of relatively thin material to form a jointless longitudinally edgeless shank portion of the shell, concomitantly fashioning the approximate form of the ends of the shell, and thereafter suitably reinforcing the said ends to withstand the stresses imparted to the ends by the piston and crank pin.

25. The process of making a connecting rod shell, which consists in forming a tube to approximate the shank and one head end of the finished shell, and then providing a second head for said shell.

26. The process of making a connecting rod shell, which consists in forming a tube to approximate the shank of the finished shell, and concomitantly providing crank and piston pin head ends for said shell, and thereafter finishing said shell.

27. The process of making a connecting rod shell, which consists in forming a two-diameter tube, and fashioning said tube to form the shank and one head portion of the shell, and then providing another head portion therefor.

28. The process of making a connecting rod shell, which consists in forming a two-diameter tube, and then fashioning said tube to form the shank and two integral head portions.

29. The process of making a connecting rod, which consists in building up a load-carrying structure of sheet metal parts, providing an outer shell or casing therefor, and welding together or unifying the parts.

30. The process of making a connecting rod, which consists in forming a shell or casing from a single piece of relatively thin material, providing said shell or casing with a load-carrying structure comprising an intermediate or shank member, and unifying the parts to form an integral structure.

31. The process of making a connecting rod shell, which consists in fashioning a single piece of relatively thin material to form a jointless, longitudinally edgeless shank of varying thickness integral with the rod shell, and concomitantly fashioning the approximate form of the ends of the shell.

In testimony, that I claim the foregoing as my invention, I have signed my name in presence of the subscribing witnesses this 21st day of April, 1916.

HEBRON BERNARD LAYMAN.

Witnesses:
M. C. MEYER,
RONALD F. KNIGHT.